United States Patent [19]

Sakagami et al.

[11] Patent Number: 4,756,973
[45] Date of Patent: Jul. 12, 1988

[54] PHOTOCHROMIC LENS

[75] Inventors: Teruo Sakagami; Katsuichi Machida; Yasufumi Fujii; Noriyuki Arakawa; Naohiro Murayama, all of Iwaki, Japan

[73] Assignee: Kureha Kagaku Kogyo Kabushiki Kaisha, Tokyo, Japan

[21] Appl. No.: 882,303

[22] Filed: Jul. 7, 1986

[30] Foreign Application Priority Data

Jul. 9, 1985 [JP] Japan .................................. 60-149343
Dec. 26, 1985 [JP] Japan .................................. 60-292347

[51] Int. Cl.⁴ ..................... B32B 27/36; G02B 5/23; C07D 498/10
[52] U.S. Cl. ................................. 428/412; 428/413; 428/447; 428/475.8; 428/519; 428/522; 428/524; 427/164; 351/166; 350/409
[58] Field of Search ................. 427/164; 428/413, 524, 428/447, 412, 519, 475.8, 522

[56]  References Cited

U.S. PATENT DOCUMENTS 3,562,172  2/1971  Ono et al. .
4,289,497  9/1981  Hovey .
4,342,668  8/1982  Hovey et al. .
4,343,857  8/1982  Uram, Jr. ..................... 427/164 X
4,367,170  1/1983  Uhlmann et al. .
4,556,605  12/1985  Mogami et al. ................ 427/164 X

FOREIGN PATENT DOCUMENTS 0146136  12/1984  European Pat. Off. .
59-202270 11/1984  Japan .
1186987   4/1970  United Kingdom .
2029410   3/1980  United Kingdom .
2117390  10/1983  United Kingdom .

Primary Examiner—P. C. Ives
Attorney, Agent, or Firm—Robert F. Ziems

[57]  ABSTRACT

A photochromic lens is composed of a lens member made of a lens resin; and a photochromic layer applied on at least one side of the lens member and formed of a resin of a three-dimensional network structure. The layer-forming resin contains a spirooxazine compound represented by the following general formula (I):

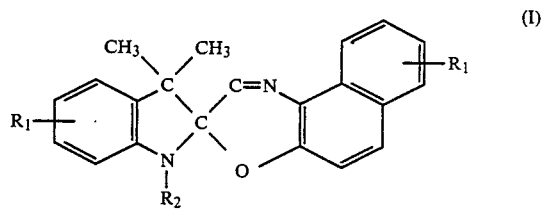

wherein $R_1$ means a hydrogen or halogen atom or a cyano, $C_{1-6}$ alkyl or $C_{1-6}$ alkoxy group, and $R_2$ denotes a $C_{1-6}$ alkyl group, $-(CH_2)_n COOH$, $-(CH_2)_n CN$, substituted arylalkyl group or $-(CH_2)_n COOR$ in which R is a $C_{1-6}$ alkyl group and n stands for an integer of 1-4. The layer-forming resin may additionally contain a phenol resin and/or a phenolic compound. A hard coat layer may optionally be applied on the surface of the photochromic layer.

7 Claims, No Drawings

PHOTOCHROMIC LENS

BACKGROUND OF THE INVENTION

1. Field of the Invention

This invention relates to a photochromic lens equipped, on at least one side thereof, with a photochromic layer formed of a resin which contains a spirooxazine compound as a photochromic substance.

2. Description of the Prior Art

Photochromism is a phenomenon of reversible changes in color, which take place when compounds of a certain sort are exposed to sunlight or ultraviolet-containing light such as light emitted from a mercury vapor lamp and after such sunlight or ultraviolet-containing light is removed. Lenses making use of the above-mentioned function of such compounds are widely known as photochromic lenses. They have been finding wide-spread commercial utility in sunglasses, prescription eyeglasses, goggles and so on.

Lenses having such a function have heretofore been limited to those obtained by dispersing minute particles of a silver halide in lenses made of inorganic glass. Almost no resin-made photochromic lenses have however been employed yet on any commercial scale, although more and more resin-made lenses have been used these days.

The following reasons may be mentioned for the lack of resin-made photochromic lenses. An inorganic material such as silver halide particles has low compatibility with resins so that it is impossible to disperse them uniformly to any sufficiently high concentration in the resins. Although organic photochromic compounds appear to have high compatibility with resins, there are only few organic photochromic compounds which are stable and useful.

For example, spiropyran compounds which are most common organic photochromic compounds exhibit useful photochromism as long as they remain in an organic solvent. Their fading rates, namely, the rates at which they regain their original colors are extremely slow in high molecular materials employed widely as optical materials and having relatively high second-order transition temperatures. For this reason, significant limitations are imposed in application on the resulting photochromic materials.

On the other hand, Japanese Patent Publication No. 28892/1970 discloses that spirooxazine compounds show photochromic effects in usual non-crosslinked polymers no matter what second-order transition temperatures the polymers have. As pointed out in Japanese Patent Publication No. 48631/1974, these spirooxazine compounds are however, accompanied by a drawback that they are not colored to any substantial extents at high temperatures above room temperature due to their high fading rates at such temperatures although they change very well in color, namely, they are colored and faded significantly upon exposure to light and removal of the light at low temperatures below 10° C. Since a photochromic lens is generally intended to develop a color or to changes its color upon exposure to strong light radiated from the sun so as to reduce the transmission of the light, it is obviously required to have sufficient coloring effect in environments of temperatures somewhat higher than normal temperature. It is here that certain limitations are generally imposed on the use of such spirooxazine compounds as photochromic materials for photochromic lenses.

SUMMARY OF THE INVENTION

An object of this invention is to provide a resin-made photochromic lens, which has sufficient coloring effects even in environments of temperatures somewhat higher than normal temperature, by using a spirooxazine compound as a photochromic material. As a result of an investigation conducted by the present inventors, it has been found unexpectedly that certain spirooxazine compounds exhibit superb photochromism even in environments of relatively high temperatures when they are contained either alone or together with a high-polarity compound in a hard medium. It has also been uncovered surprisingly that a resin lens equipped with a photochromic layer containing one of such spirooxazine compounds with or without a phenol resin and/or a phenolic compound in a resin of a three-dimensional network structure shows a particularly good function as a photochromic lens. Based on these findings, the present invention has been brought to completion.

In one aspect of this invention, there is thus provided a photochromic lens comprising:
a lens member made of a lens resin; and
a photochromic layer applied on at least one side of the lens member and formed of a resin of a three-dimensional network structure, said layer-forming resin containing a spirooxazine compound represented by the following general formula (I):

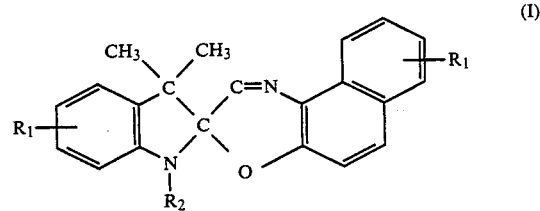

wherein $R_1$ means a hydrogen or halogen atom or a cyano, $C_{1-6}$ alkyl or $C_{1-6}$ alkoxy group, and $R_2$ denotes a $C_{1-6}$ alkyl group, $-(CH_2)_n-COOH$, $-(CH_2)_n-CN$, substituted arylalkyl group or $-(CH_2)_n-COOR$ in which R is a $C_{1-6}$ alkyl group and n stands for an integer of 1-4.

In another aspect of this invention, the layer-forming resin contains a phenol resin and/or a phenolic compound in addition to the spirooxazine compound of the general formula (I).

Accordingly, the photochromic lens of this invention features that the photochromic layer formed of the resin of the three-dimensional network structure is provided on at least one side of the lens member made of the lens resin and called "plastic lens" generally, and the spirooxazine compound is contained with or without at least one of the phenol resin and phenolic compound in the hard photochromic layer.

Owing to the above-mentioned constitution, superb photochromism is exhibited by the spirooxazine compound not only at normal temperature but also in an environment of a temperature somewhat higher than normal temperature, thereby providing sufficient photochromic effects.

The spirooxazine compound represented by the general formula (I) can develop a color to a remarkable extent even in an environment of a relatively high temperature as described above. The following reason may be contemplated for this feature. In the photochromic layer formed of the resin having a high degree of hardness owing to its three-dimensional network structure, one or more colored spirooxazine isomers are probably formed as ions upon exposure to light and may then be allowed to remain in relatively stable state. This seems to be enhanced when the phenol resin and/or phenolic compound are also contained. For the reasons mentioned above, the colored state are allowed to remain sufficiently.

Needless to say, the photochromic lens of this invention also has excellent scratch resistance because the photochromic layer protects its associated surface of the resin-made lens member.

DETAILED DESCRIPTION OF THE INVENTION AND PREFERRED EMBODIMENTS

Spirooxazine compounds useful in the practice of this invention are represented by the general formula (I). As certain representative examples of such spirooxazine compounds, may be mentioned:

1,3,3-trimethylspiro[indoline-2,3'-naphtho[2,1-b](1,4)-oxazine];
1,3,3,5-tetramethylspiro[indoline-2,3'-naphtho[2,1-b](1,4)-oxazine];
5-chloro-1,3,3-trimethylspiro[indoline-2,3'-naphtho[2,1-b](1,4)-oxazine];
5-methoxy-1,3,3-trimethylspiro[indoline2,3'-naphtho[2,1-b](1,4)-oxazine];
1-isopropyl-3,3-dimethylspiro[indoline 2,3'-naphtho[2,1-b](1,4)-oxazine]; and
1-benzyl-3,3-dimethylspiro[indoline-2,3'-naphtho[2,1-b](1,4)-oxazine].

These spirooxazine compounds can each be synthesized by refluxing an ethanol solution of an equimolar mixture of a 1,3,3-trimethyl-2-methyleneindoline derivative, which contain one or more of various substituent groups, and 2-nitroso-1-naphthol and reacting them to each other in a nitrogen gas atmosphere. As an alternative, they can also be synthesized individually by refluxing an indolinium iodide, which corresponds to the methyleneindoline compound, together with a basic compound such as triethylamine and 2-nitroso-1-naphthol.

Such spirooxazine compounds exhibit their effects markedly when contained in photochromic layers formed on surfaces of lens members, especially, when they are contained along with a phenol resin and/or a phenolic compound.

The following process may preferably be employed to form a photochromic layer made of a resin, which contains one of the above-mentioned spirooxazine compounds of the general formula (I), on at least one side of a lens member.

A layer-forming resin or its precursor (i.e., its corresponding monomer or oligomer which undergoes polymerization or hardening to afford a resin-like material by heat or another polymerization means) and a suitable spirooxazine compound are mixed with or without a phenol resin and/or phenolic compound in the presence or absence of a solvent to prepare a coating formulation suitable for use in the formation of a photochromic layer. This coating formulation is thereafter applied on at least one side of a resin-made lens member. Here, isopropanol, methyl ethyl ketone, acetone, ethylcellosolve or the like may preferably be used as the solvent. The solvent may not be required specifically when the resin precursor is in a liquid form. By heating and drying the coated lens member subsequent to the coating operation, a photochromic layer is formed. Use of a resin precursor in the coating formulation permits the formation of a resin of a three-dimensional network structure upon its hardening under heat.

Transparent resins having good compatibility with the above-described spirooxazine compounds may be used to form photochromic layers containing the spirooxazine compounds. Polyfunctional acrylic or methacrylic resins may be mentioned as examples of such transparent resins. When resin precursors are employed, such precursors may include precursors of thermosetting resins hardenable by their heating, such as epoxy resins, phenol resins, urethane resins, melamine resins, alkyd resins and the like. Of these, epoxy resins are particularly preferred. It is also possible to use silicone resins of silicone-base hard coating agents, which are employed to form hard coat layers as will be described subsequently. Especially, the above-described thermosetting resins and silicone resins allow the spirooxazine compounds to exhibit their photochromic effects fully since they have three-dimensional network structures.

Upon formation of the above-mentioned photochromic layer, one or more of various additives may also be incorporated obviously. An addition of a high-polarity phenolic compound as such an additive is particularly effective in improving the development of a color by each of the spirooxazine compounds represented by the general formula (I).

Although the ratio of the spirooxazine compound to its associated resin in each photochromic layer varies depending on their kinds, it is preferable to use the spirooxazine compound in an amount ranging from 3–60 parts by weight per 100 parts by weight of the resin. The preferable thickness of the photochromic layer may generally range from 0.2 $\mu$m to 200 $\mu$m or so.

It is also feasible to provide a hard coat layer additionally on the surface of the photochromic layer in the present invention. This hard coat layer may be formed by applying a coating formulation, which has in turn been obtained by diluting a hard coating agent with a solvent, on the photochromic lens formed on at least one side of the lens member and then subjecting the thus-applied coating formulation to a hardening treatment in accordance with a suitable method which can be chosen depending on the kind of the hard coating agent, for example, by drying or heating it or exposing it to an ultraviolet ray or electron beam. Application of the coating formulation can be carried out by using any conventional coating technique as is. Specifically, the coating formulation may be applied, for example, by coating it uniformly by means of a spinner or the like or by spraying it. The hard coat layer may be formed on one side of the lens member only. Alternatively, it may be formed on each side of the lens member. The preferable thickness of the hard coat layer may be within a range of 1 $\mu$m–100 $\mu$m.

As the hard coating agent employed for the formation of the hard coat layer in the present invention, a silicone-base hard coating agent, polyfunctional acrylic hard coating agent, melamine-base hard coating agent, urethane-base hard coating agent, alkyd-base hard coating agent, silica sol base hard coating agent or another organic hard coating agent may be used preferably, with a silicone-base hard coating agent such as silicone hard coating agent or silica sol hard coating agent being particularly preferred.

Any silicone hard coating agent may be used in the present invention, so long as it forms an organopolysiloxane, i.e., a multi-dimensionally crosslinked structure via a silanol by its self-condensation as a result of hydrolysis of an organoalkoxy silane as shown by the following reaction formula:

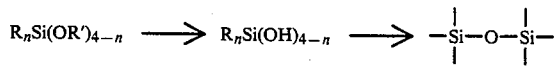

In order to improve the surface hardness, it is generally suitable to employ a hard coating agent which contains tri-functional or higher polyfunctional polysiloxane units such as

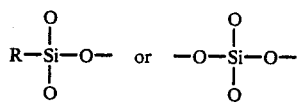

Such a hard coating agent is also employed as a preferable hard coating agent in the present invention. In the above formulae, R means an organic functional group such as

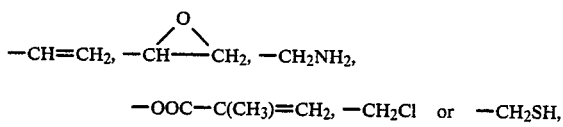

a group active for hydrolytic condensation such as —H, —Cl or —OH, or an aliphatic or aromatic hydrocarbon residual group, n stands for an integer of 2 or smaller, and R' denotes an aliphatic or aromatic hydrocarbon residual group or the like.

As preferable specific hard coating agents, may be mentioned methyltrimethoxysilane, tetramethoxysilane, phenyltrimethoxysilane, methacryloxytriethoxysilane, γ-glycidoxypropyltrimethoxysilane, γ-aminopropyltriethoxysilane, vinyltrimethoxysilane, vinyltris(2-methoxyethoxy)silane, etc. It should however be borne in mind that the hard coating agent is not necessarily limited to those referred to above by way of example.

The provision of the hard coat layer in the present invention can improve the solvent resistance and at the same time, the surface hardness to increase the abrasion resistance, namely, the scratch resistance significantly, although the lens is a photochromic lens. Unlike other photochromic compounds, the spirooxazine compounds of the general formula (I) exhibit excellent functions under such conditions that they can contact oxygen. Since a silicone-base hard coat layer of a silicone hard coating agent or silica sol hard coating agent has a high degree of transmittance for oxygen gas, it allows the associated spirooxazine compound to exhibit its photochromic effects suitably in the associated lens member or photochromic layer. When the photochromic lens of this invention is used over an extremely long period of time under natural environmental conditions, there is a possible change that the spirooxazine compound might be hydrolyzed as a result of its contact with moisture in the air, wearer's sweat and/or the like and the photochromic function of the photochromic lens could hence be reduced. The provision of such a hard coat layer can however improve its weatherability further. The thickness of such a silicone-base hard coat layer may be 0.1 μm–200 μm, preferably, 0.5 μm–100μm.

In the present invention, it is of course feasible to use two or more of the above-described various hard coating agents in combination or to form a hard coat layer in the form of a laminate composed of two or more layers.

No particular limitation is vested on the phenolic compound which may also be incorporated together with the spirooxazine compound in the photochromic layer in this invention. The phenolic compound may be either monohydric phenol or polyhydric phenol. It may additionally contain one or more benzene nuclei like naphthol, instead of only one phenol nucleus. Needless to say, these phenolic compounds may be substituted by alkyl groups, halogen atoms and/or the like.

Specifically, an alkyl-substituted phenol such as p-tert-butylphenol, 2,6di-tert-butyl-4-methylphenol or 2,4,6-tri-tert-butylphenol may preferably be used as the phenolic compound. Further, a high-polarity phenolic compound of a high molecular weight is generally suitable in deriving the photochromism of the spirooxazine compound in particular. For example, bisphenol A having the following chemical formula or its derivative is preferred.

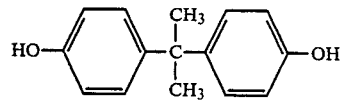

Specifically, it is preferable to use bisphenol A, tetrabromobisphenol A, or 2-(4-hyroxyethoxyphenyl)-2-(4'-hydroxyphenyl)propane which is obtained as a result of addition of ethylene oxide to one of the two —OH groups, or the like.

Exemplary phenol resins usable in the present invention may include resins obtained by polycondensation between phenols such as phenol, cresol, xylenol and resorcin and aldehydes such as formaldehyde, acetaldehyde and furfural as well as their modified resins. Of these, a phenol resin obtained from phenol and formaldehyde is particularly preferred.

When a phenol resin and/or a phenolic compound are incorporated, their total proportion may be 0.02–100 parts by weight, preferably, 0.1–100 parts by weight per 100 parts by weight of the resin in the photochromic layer. Any proportions smaller than 0.02 parts by weight are too little to ensure photochromism of the photochromic layer at high temperatures. If their total proportion is greater than 100 parts by weight on the other hand, the fading rate of the photochromic layer from its colored state is lowered.

In order to optimize the light-regulating effects of the resulting photochromic lens, one or more of various suitable additives such as dyes, ultraviolet absorbents and sensitizers may also be used in combination with the spirooxazine compound in the present invention.

No particular limitation is imposed on a material which is to be employed to form a resin-made lens member in the present inVention. It is possible to use, for example, a material employed conventionally as a material for plastic lenses such as polymethyl methacrylate, diethylene glycol bis(allylcarbonate) resin (e.g., "CR-39", trade name), polycarbonate or polystyrene; or a nylon-base resin, polyacrolein-base resin, bromine-substituted aromatic methacrylate-base resin or the like, which has been finding growing utility in recent years and has a high refractive index.

The photochromic lens of this invention, which is produced in the above-described manner, exhibits light-regulating effects upon its exposure to light or after removal of the light. At normal temperature of 25° C. or so and even at still higher temperatures, it develops a color of sufficient density and moreover, its coloring and fading rates are high enough to assure its practical application.

Photochromic lenses of this invention can be used as sunglasses, prescription eyeglasses, various goggles, etc. and are hence useful. [Examples]

The present invention will hereinafter be described in further detail by the following Examples. It should however be borne in mind that the present invention is not necessarily limited to or by the following Examples.

Example 1

(1) Synthesis of 1,3,3-trimethylspiro[indoline-2,3′-naphtho[2,1-b](1,4)oxazine]:

An equimolar mixture of 1-nitroso-2-naphthol and 1,3,3-trimethyl-2-methyleneindoline was dissolved in ethanol. While blowing nitrogen gas, the resultant solution was refluxed for 2 hours. After the reaction solvent, i.e., ethanol was driven off, the residue was taken up in acetone and the resultant acetone solution was then cooled to obtain 1,3,3-trimethylspiro[indoline-2,3′-naphtho[2,1-b](1,4)-oxazine] as crude crystals. They were recrystallized from acetone to obtain the intended product as pale brown crystals.

(2) Preparation of a resin formulation for the formation of photochromic layers:

Mixed vigorously at room temperature were 40 parts by weight of phenyltrimethoxysilane, 7.6 parts by weight of methylphenyldimethoxysilane, 45.6 parts by weight of tetramethoxysilane and 100 parts by weight of isopropanol, followed by a dropwise addition of 35 parts by weight of 0.05 N hydrochloric acid. The resultant mixture was stirred for further 2 hours. The stirring was then stopped and the mixture was aged at room temperature for 24 hours, thereby obtaining a resin formulation of the formation of photochromic layers.

(3) Preparation of a coating formulation and its coating:

Dissolved in 100 parts by weight of the resin formulation obtained in the above procedure (2) were 1.7 parts by weight of the spirooxazine compound synthesized in the above procedure (1), whereby a coating formulation was obtained. The coating formulation was coated by the spraying technique on a lens member the material of wnich was a diethylene glycol bis(allylcarbonate) resin, "CR-39" (trade name). After predrying the coated lens member for 1 hour in a hot air drier of 50° C., it was heated and hardened overnight at 80° C. to obtain a photochromic lens of this invention. The photochromic lens was somewhat bluish and transparent. When the photochromic lens was exposed to an ultraviolet ray from an ultraviolet inspection lamp "Model UVL-21" (trade name; manufactured by UVP Inc.), a blue color was developed instantaneously. When the radiation of the ultraviolet ray was stopped, its fading took place rapidly and its original state was substantially regained 9 minutes later at 30° C. From the above fact, it has been recognized that the above photochromic lens has a high fading rate and excellent photochromic effects.

EXAMPLE 2

A photochromic lens of this invention was produced in the same manner as in Example 1 except that upon preparation of a coating formulation, 1.5 parts by weight of bisphenol A was also dissolved together with 1.7 parts by weight of the spirooxazine compound. The photochromic lens was also scmewhat bluish and transparent.

When the photochromic lens was exposed at 30° C. to an ultraviolet ray from the ultraviolet inspection lamp "Model UVL-21" (trade name; manufactured by UVP Inc.), a blue color was developed instantaneously. The intensity of the blue color was as much as about twice the color developed by the photochromic lens in Example 1. When the radiation of the ultraviolet ray was stopped, its fading took place rapidly to return substantially to its original state 9 minutes later at 30° C.

From the above fact, it has been recognized that even at a temperature as high as 30° C., the above photochromic lens exhibits an extremely-good color-producing function and moreover, has a high fading rate and hence excellent photochromic effects.

EXAMPLE 3

(1) Synthesis of 5-chloro-1,3,3-trimethylspiro[indoline-2,3′-naphtho[2,1-b](1,4)oxazine]:

An equimolar mixture of ° 1-nitroso-2-naphthol and 5-chloro-1,2,3,3-tetramethylindole iodide was dissolved, together with triethylamine in an amount twice the 1-nitroso-2-naphthol, in ethanol. While blowing nitrogen gas, the resultant solution was refluxed for 2 hours. After the reaction solvent, i.e., ethanol was driven off, the residue was taken up in acetone and the resultant acetone solution was then cooled to obtain 5-chloro-1,3,3-trimethylspiro[indoline-2,3′-naphtho[2,1-b](1,4)-oxazine] as crude crystals. They were recrystallized from acetone to obtain the intended product as pale brown crystals. (2) Preparation of a coating formulation and its coating:

In 100 parts by weight of the resin formulation obtained in the procedure (2) of Example 1, 1.7 parts by weight of the spirooxazine compound synthesized in the above procedure (1) were dissolved to prepare a coating formulation. The coating formulation was coated by the spraying technique on a lens member the material of which was "CR-39". After predrying the coated lens member for 1 hour in a hot air drier of 50° C., it was heated and hardened overnight at 80° C. to obtain a photochromic lens of this invention. The photochromic lens was somewhat bluish and transparent. When the photochromic lens was exposed to sunlight, a blue color was developed instantaneously. When the photochromic lens was then immediately placed in a dark place, it returned substantially to its original colorless state 9 minutes later at 30° C. It has thus been recognized that the photochromic lens has a high fading rate and excellent photochromic effects.

EXAMPLE 4

A photochromic lens of this invention was produced in the same manner as in Example 3 except that upon preparation of a coating formulation, 1.5 parts by weight of p-tert-butylphenol was also dissolved together with 1.7 parts by weight of the spirooxazine compound. The photochromic lens was somewhat bluish and transparent. When the photochromic lens was exposed to sunlight, a blue color was developed instantaneously. The intensity of the blue color was far greater compared with the color developed by the photochromic lens produced in Example 3. When the photochromic lens was then immediately placed in a dark place, it returned substantially to its original colorless state 9 minutes later at 30° C. It has thus been recognized that the photochromic lens has a high fading rate and extremely-good photochromic effects.

EXAMPLE 5

Dissolved in 40 parts by weight of isopropanol were 1.0 part by weight of the spirooxazine compound synthesized in Example 1, namely, 1,3,3-trimethylspiro[indoline-2,3'-naphtho[2,1-b](1,4)-oxazine]along with 30 parts by weight of a commercial silicone coat primer "PH 39" (trade name; product of Toshiba Silicone Co., Ltd.), thereby obtaining a coating formulation. The coating formulation was then applied by the spraying technique on a lens member the material of which was "CR-39". After drying the thus-coated lens member at 50° C. for 1 hour, another coating formulation which had been obtained by diluting the primer "PH 93" to a volume double its original volume with isopropanol was coated by the spraying technique. The resultant lens was dried again at 50° C. for 1 hour.

Thereafter, the above-prepared lens was coated with a silicone coating agent "TOSGUARD 505" (trade name; product of Toshiba Silicone Co., Ltd.) by the dipping technique. After predrying it at 50° C. for 1 hour, it was heated and hardened overnight at 90° C. to obtain a photochromic lens of this invention. This photochromic lens was colorless and transparent.

When the photochromic lens was exposed to sunlight, it instantaneously developed a deep blue color. When it was placed in a dark place immediately thereafter, its clearing took place rapidly and it returned completely to its original colorless state 5 minutes later at 30° C. It has thus been recognized that the photochromic lens has a high clearing rate and excellent light-regulating effects.

EXAMPLE 6

A photochromic lens of this invention was obtained in the same manner as in Example 5 except that upon preparation of a coating formulation, 1.0 part by weight of tetrabromobisphenol A was dissolved together with 1.0 part by weight of the spirooxazine compound and a formulation obtained by diluting "TOSGUARD 520" (trade name; product of Toshiba Silicone Co., Ltd.) to a concentration of 30% with isopanol was used as a silicone coating agent in place of "TOSGUARD 505". The photochromic lens was colorless and transparent.

When the photochromic lens was exposed to sunlight at 30° C., it instantaheously developed a deep blue color. Comparing with the photochromic lens prepared in Example 5, the intensity of the blue color was above twice. When it was placed in a dark place immediately thereafter, it returned substantially to its original colorless state 5 minutes later at 30° C.

From the above fact, it has been recognized that even at 30° C., the photochromic lens shows an excellent color-developing function and moreover, its clearing rate is high and it hence has extremely good photochromic effects.

EXAMPLE 7

In a commercial phenol resin solution, "PLY-O-PHEN TD-447" (trade name; product of Dainippon Ink & Chemicals, Inc.) in an amount of 100 parts by weight in terms of its resin content, 1.5 parts by weight of the spirooxazine compound synthesized in Example 1, i.e., 1,3,3-trimethylspiro[indoline-2,3'-naphtho[2,1-b](1,4)-oxazine]and 1.0 part by weight of bisphenol A were dissolved, followed by an addition of 100 parts by weight of a silica sol solution, "LOSCAL-1432" (trade name; product of Catalysts & Chemicals Industries Co., Ltd.; SiO$_2$ content: 30%), to obtain a coating formulation.

The coating formulation was applied by the dipping technique on a lens member the material of which was "CR-39". The thus-coated lens member was dried at 80° C. for 5 hours, thereby obtaining a photochromic lens of this invention. This photochromic lens was slightly yellowish and transparent.

When the photochromic lens was exposed to sunlight at 30° C., it instantaneously developed a deep blue color. It was hence useful as a photochromic lens. When it was placed in a dark place immediately thereafter, it returned substantially to its original colorless state 10 minutes later at 30° C.

From the above fact, it has been recognized that even at 30° C, the photochromic lens shows an excellent color-developing function and moreover, its fading rate is high and it hence has excellent photochromic effects.

EXAMPLE 8

In 75 parts by weight of a commercial epoxy resin solution, "EPONIX #1100 CLEAR" (trade name; product of Dai Nippon Toryo Co., Ltd.), 2.0 parts by weight of the spirooxazine compound synthesized in Example 1, i.e., 1,3,3-trimethylspiro[indoline-2,3'-naphtho[2,1-b](1,4)-oxazine]and 2.0 part by weight of bisphenol A were dissolved to obtain a coating formulation. The coating formulation was applied by the dipping technique on a lens member the material of which was "CR-39". The thus-coated lens member was dried at 60° C. for 24 hours. A solution, which had been prepared by diluting a silicone coating agent "TOSGUARD 520" (trade name; product of Toshiba Silicone Co., Ltd.) to a concentration of 30% with isopropanol, was additionally coated on the above-coated lens by the dipping technique. After predrying the resultant lens at 50° C. for 1 hour, it was heated and hardened at 90° C. for 2 hours to obtain a photochromic lens of this invention.

Even before application of the coating layer with the silicone coating ageht, the lens had the hard coat layer of a significantly high surface hardness owing to the use of the epoxy resin and hence, the lens had practical utility as a photochromic lens. A still better surface hardness was however imparted owing to the application of the coating layer with the silicone coating agent.

The above-obtained photochromic lens was colorless and transparent. When it was exposed to sunlight at 30° C., it developed a deep blue color 3 seconds later. When it was placed in a dark place immediately thereafter, it returned completely to its original colorless state 5 minutes later at 30° C. From the above fact, it has been recognized that even in environments of relatively high temperatures, the photochromic lens shows an excellent color-developing function and moreover, its clearing rate is high and it hence has excellent photochronic effects.

EXAMPLE 9

In 100 parts by weight of an epoxy resin precursor solution, "EPONIX 1100" (trade name; product of Dai Nippon Toryo Co., Ltd.), 10 parts by weight of 5-chloro-1,3,3-trimethylspiro[indoline-2,3'-naphtho[2,1-b](1,4)-oxazine]synthesized in Example 3 were dissolved, followed by its dilution with 100 parts by weight of methyl ethyl ketone to obtain a coating formulation.

The coating formulation was applied by the dipping technique on a lens member the material of which was "CR-39". The thus-coated lens member was dried at 120° C. for 3 hours to form photochromic layers of 25 μm thick, thereby preparing a photochromic lens.

A silicone-base hard coating agent, "X-12-1100" (trade name; product of Shin-Etsu Chemical Co., Ltd.) was then coated on the photochromic layers by the dipping technique. After predrying the resultant lens by allowing it to stand at room temperature for 30 minutes, it was heated and hardened at 80° C. for 3 hours to obtain hard coat layers of 20 μm thick, thereby preparing a photochromic lens of this invention.

The surface hardness of the photochromic lens was found to be 3H in terms of the pencil hardness scale, thereby showing excellent abrasion resistance. It was not damaged by various solvents. Further, it exhibited a stable and excellent photochromic function.

The durability of the photochromic lens was tested. Namely, an accelerated exposure test was conducted by means of "SUPER LONG LIFE SUNSHINE WEATHEROMETER" (trade mark; manufactured by Suga Testing Machine Co., Ltd.), using the above photochromic lens as a sample. It was confirmed that even after an elapsed time of 80 hours, it retained its colorless and transparent state and exhibited substantially the same excellent photochromic effects as it showed in the beginning.

Having now fully described the invention, it will be apparent to one of ordinary skill in the art that many modifications and changes can be made thereto without departing from the spirit or scope of the invention as set forth herein.

We claim
1. A photocromic lens comprising:
a lens member made of a lens resin; and
a photocromic layer applied on at least one side of the lens member and formed of a resin of a three-dimensional network structure, said layer-forming resin containing a spirooxazine compound represented by the following general formula (I) along with a phenol resin and/or a phenolic compound:

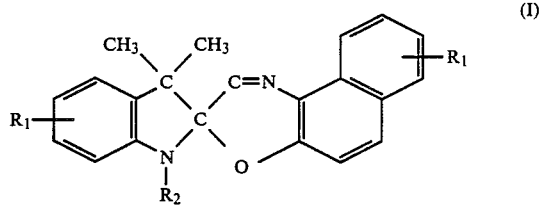

wherein $R_1$ means a hydrogen or halogen atom or a cyano, $C_{1-6}$ alkyl or $C_{1-6}$ alkoxy group, and $R_2$ denotes a $C_{1-6}$ alkyl group, $-(CH_2)_n COOH$, $-(CH_2)_n CN$, substituted arylalkyl group or $-(CH_2)_n COOR$ in which R is a $C_{1-6}$ alkyl group and n stands for integer of 1-4.

2. The photochromic lens as claimed in claim 1, wherein the phenolic compound is an alkyl-substituted phenolic compound.

3. The photochromic lens as claimed in claim 1, wherein the phenolic compound is bisphenol A or a derivative thereof.

4. The photochromic lens as claimed in claim 1, wherein the layer-forming resin is an epoxy resin.

5. The photochromic lens as claimed in claim 1, further comprising a hard coat layer on the surface of the photochromic layer.

6. The photochromic lens as claimed in claim 5, wherein the hard coat layer is a silicone-base hard coat layer.

7. The photochromic lens as claimed in claim 1, wherein the lens member is made of a material selected from the group consisting of an acrylic resin such as polymethyl methacrylate, diethylene glycol bis(allylcarbonate) resin, polycarbonate, polystyrene, a nylon-base resin, polyacrolein-base resin and bromine-substituted aromatic methacrylate-base resin.

* * * * *

UNITED STATES PATENT AND TRADEMARK OFFICE
CERTIFICATE OF CORRECTION

PATENT NO. : 4,756,973
DATED     : July 12, 1988
INVENTOR(S) : Teruo Sakagami et al It is certified that error appears in the above-identified patent and that said Letters Patent is hereby corrected as shown below:

Claim 1, line 1, "photocromic" should read --photochromic--;

line 3, "photocromic" should read --photochromic--; and

Column 12, line 21, after "for" insert --an--.

Signed and Sealed this

Twenty-second Day of November, 1988

Attest:

DONALD J. QUIGG

*Attesting Officer*     Commissioner of Patents and Trademarks